United States Patent [19]

Eisenmann

[11] Patent Number: 5,226,798
[45] Date of Patent: Jul. 13, 1993

[54] GEAR RING PUMP FOR INTERNAL-COMBUSTION ENGINES AND AUTOMATIC TRANSMISSIONS

[76] Inventor: Siegfried A. Eisenmann, Conchesstr. 25, D-7960 Aulendorf, Fed. Rep. of Germany

[21] Appl. No.: 883,937

[22] Filed: May 15, 1992

Related U.S. Application Data

[63] Continuation of Ser. No. 593,135, Oct. 5, 1990, abandoned.

[30] Foreign Application Priority Data

Nov. 17, 1989 [DE] Fed. Rep. of Germany ....... 3938346

[51] Int. Cl.⁵ .............................................. F04C 2/10
[52] U.S. Cl. ................................. 418/109; 418/150; 418/152; 418/171; 418/178; 418/179
[58] Field of Search ............... 418/108, 109, 150, 152, 418/166, 171, 178, 179

[56] References Cited

U.S. PATENT DOCUMENTS

| 1,486,836 | 3/1924 | Hill . | |
| 1,516,591 | 11/1924 | Edwards | 418/171 |
| 4,013,388 | 3/1977 | Stratman | 418/171 |
| 4,504,202 | 3/1985 | Saegusa | 418/150 |
| 4,976,595 | 12/1990 | Taniguchi | 418/171 |

FOREIGN PATENT DOCUMENTS

| 0079156 | 5/1983 | European Pat. Off. . | |
| 0375337 | 6/1990 | European Pat. Off. . | |
| 2000302 | 1/1971 | Fed. Rep. of Germany | 418/171 |
| 1811976 | 8/1974 | Fed. Rep. of Germany . | |
| 3620705 | 12/1987 | Fed. Rep. of Germany . | |
| 59-115484 | 7/1984 | Japan | 418/152 |
| 60147589 | 8/1989 | Japan | 418/171 |
| 668805 | 1/1989 | Switzerland . | |
| 9359 | 6/1916 | United Kingdom . | |
| 233423 | 5/1925 | United Kingdom . | |
| 2002453 | 2/1979 | United Kingdom . | |

OTHER PUBLICATIONS

Decker, Karl-Heinz: Maschinenelements, 9, Auflage, 1985, pp. 410–412.
Pamphlet "Schmierung", DEA und Texaco Verkauf GmbH Hamburg, Nr. 1, 1970.

*Primary Examiner*—John J. Vrablik
*Attorney, Agent, or Firm*—Armstrong, Westerman, Hattori, McLeland & Naughton

[57] ABSTRACT

The invention proposes in gear ring pumps for reciprocating internal-combustion engines and/or automatic transmissions allowing the hollow gear to run in the hollow gear housing with a play which is large enough for the pronounced fluctuations of the radial position of the crankshaft or input shaft carrying the pinion of the gear ring pump to be taken up thereby and selecting a toothing for the pump such that the effective mounting of the hollow gear on the pinion is achieved. If a correspondingly largeplay is provided between the shaft and the pinion, the hollow gear is mounted with minimum play in the housing. The pinion is then mounted in the hollow gear.

11 Claims, 6 Drawing Sheets

GEAR RING PUMP FOR INTERNAL-COMBUSTION ENGINES AND AUTOMATIC TRANSMISSIONS

This application is a continuation of application Ser. No. 593,135 filed Oct. 5, 1990, now abandoned.

BACKGROUND OF THE INVENTION

1. Field of the Invention

The invention relates to an oil pump constructed as gear ring pump for reciprocating piston internal-combustion engines and automatic transmissions. In particular, the invention relates to such an oil pump for the engines and automatic transmissions of motor vehicles.

2. Description of the Prior Art

In engines, the pump normally serves to supply the engine with lubricating oil whilst in transmissions it normally supplies them with hydraulic oil for actuating the switching elements but also with oil for cooling the hydrodynamic converter and with lubricating oil for the gears. The pump housing can be flanged directly to the aggregate housing. In the aforementioned automatic transmissions the transmission input shaft may also be formed as part of the rotating converter housing. The formation of the oil pump as gear ring pump, the pinion of which is mounted directly on the main shaft of the aggregate, has many advantages. In particular, it is very simple in construction and avoids separate drive elements for a separately arranged oil pump. However, this essential advantage is offset by the disadvantage that in the internal-combustion engines and transmissions mentioned the main shafts execute considerable transverse displacements in operation due to the greatly changing operating conditions. Thus, the radial play which the centre of the crankshaft of the engine of an automobile executes is of the order of magnitude of 0.1 to 0.2 mm.

The result of this is that the pinion of the gear ring pump mounted on the shaft must also follow most of the centre displacement of the shaft. Since the hollow gear is practically always mounted in a separate housing which is screwed to the engine and transmission housing, additional radial shifts also occur so that the deviations of the desired position add up and in total may amount to several tenths of a millimeter. If the tooth play between pinion and hollow gear is made large enough to take up all these errors in the meshing play without constraints and inadmissible large loads destroying the toothing, this results in substantial disadvantages. Firstly, the sealing between the working chambers will no longer suffice for the delivery pressure. In particular at low speeds of rotation of the engine or the transmission the volumetric efficiency of the pump plays a major part and depends in particular in the gear ring pump on the tooth flank play. It should be remembered here that in the pumps improved by the invention, in which the hollow gear has only one tooth more than the pinion, all the teeth of the pinion and of the hollow gear are to be continuously in engagement with each other. The demand for high tooth play for compensating the pinion shifts leads therefore also to a very high play not only between the driving tooth flanks but also between the sealing tooth heads. This leads necessarily to a considerable impairment of the volumetric efficiency.

Since of course relatively little energy is necessary to generate noises, gears with large tooth play tend to hammer against each other, particularly when unsteady movement states are present as is the case in the gear ring pumps improved by the invention. In particular, in crankshafts of motor vehicles such unsteady movements are present not only in the radial direction but also in the peripheral direction so that a combination of translational and rotational oscillations occurs which is transmitted almost completely to the pinion. Since the hollow gear follows its own dynamic laws of motion, knocking sounds arise with large tooth pay which today cannot be considered acceptable.

In the gear pumps used today of the type outlined at the beginning, as a rule the tooth form of the one gear is defined by rolling on the tooth form of the other gear, this requiring of course a predetermined axial spacing. With a large tooth play, and this is necessary unless other precautions are taken, these generation conditions are no longer present so that the requirement for constant rotation angle transmission ratio in every relative angular position is no longer fulfilled. These errors also then generate accelerations and decelerations which manifest themselves as knocking.

Attempts have been made to master these problems by not only making the tooth play large but also the bearing play of the hollow gear in its housing. However, this not only likewise leads to noises but also to rapid wear of the toothing. Moreover, the tooth flank forms hitherto employed, which were usually defined as relatively easily calculatable and produceable arcs and trochoids, have unfavourable engagement angles, radii of curvature which are too small at the engagement points and poor or even no engagement relationships in the tooth bottom. If the pinion is mounted in the pump housing with a collar this increases the length of the engine or the transmission and adds to the constructional expenditure.

SUMMARY OF THE INVENTION

The invention therefore has as its object to improve considerably the gear ring pumps of the type described as regards low noise and high resistance to wear as well as volumetric efficiency. It proceeds from the basic idea that the toothing itself is formed with high precision and minimum play and that the problems of pronounced deflections of the pinion centre point are solved in that the radial supporting of the hollow gear in the housing or the radial mounting of the pinion on the shaft is effected with play taking up said deflections.

The invention therefore proposes in an oil pump constructed as gear ring pump for reciprocating piston internal-combustion engines and automatic transmissions comprising a pump housing, a pinion which is non-rotatably mounted on the crankshaft of the engine or the input shaft of the transmission, and a hollow gear which is axially and radially guided in the housing, meshes with the pinion and has one tooth more than said pinion, the improvement wherein either, with the pinion fixedly mounted on the shaft, the hollow gear in the housing or, with the hollow gear guided with minimum radial play in the housing, the pinion on the shaft is guided in the radial direction with a play which is large enough not to inhibit the radial movements of the shaft but is far smaller than the eccentricity between the pinion and hollow gear, the hollow gear and the pinion are mounted in or on each other with their toothings in radial direction with minimum play, the tooth heads and gaps of the gears have the profile of cycloids which are formed by rolling of forming circles (kHE, kHH, kRE, kRH, FIG. 3 and 4) on fixed circles (KHF, KRF) extending concentrically to the respective gear axes (H and R), the tooth heads of the pinion and the tooth gaps of the hollow gear each have the form of epicycloids which are formed by rolling of a first forming circle (kRE, kHE), the tooth gaps of the pinion and the tooth heads of the hollow gear each have the form of hypocycloids which are formed by rolling of a second forming circle (kRH, kHH), and the sum of the circumferences of the two forming circles is at least approximately, preferably however exactly, equal to the tooth pitch of the gears on their fixed circles (KRF, KHF).

The "large" play between the hollow gear and the housing or between the pinion and the shaft is preferably only a few hundredths of a millimeter larger than twice the maximum deviation of the shaft centre from the ideal position thereof to be expected after usual wear.

The toothing selected permits in the first alternative an optimum precise supporting, i.e. mounting of the hollow gear, on the pinion so that the hollow gear can also perform the radial shifts of the pinion and the shaft without excessively large forces thereby occurring. The support of the hollow gear against entrainment in a rotation about the axis of the pinion is effected here in the usual manner by peripheral mounting in the housing. However, since the bearing bore in the housing has a somewhat greater diameter than the outer diameter of the hollow gear, the latter can compensate different radial positions by bearing against different points of its peripheral mounting in the housing.

Such a construction permits not only an optimum number of support points of the hollow gear on the pinion; in addition, the support points have only a very small specific pressure (Hertz pressure) so that they can stand up to the dynamic stresses occurring. Due to the small differences in the curvature of the respective surfaces cooperating with each other of the pinion tooth and hollow gear tooth, the support points are very well able to build up unsteady hydrodynamic lubricating films which form a separating and supporting element between the toothings. The tooth play should not be greater than that adequate for the buildup of such a film.

A further substantial advantage resides in that with the toothing chosen the engagement angle at the point of the lowest tooth engagement at the level of the pitch circles is practically zero. The dynamic forces between the two gears act primarily in the direction of the axis spacing line. These forces are also taken up very well because at the point of lowest tooth engagement the toothing, due to the meshing of epicycloids and hypocycloids as tooth head and tooth gap, have a mathematically almost one hundred percent flush relationship, leading also to an optimum damping lubricating film. In the region opposite the deepest tooth engagement the tooth heads of the two gears bear on each other with the maximum possible radii of curvature of these epicycloids and hypocycloids. The radii of curvature are approximately of equal magnitude. The Hertz pressures at these engagement points are therefore at a minimum. Since the relative speed there between the tooth heads is greatest, due to the large radii of curvature at the engagement points a hydrodynamic lubricating film separating the sliding partners forms. It has been found in comparative measurements that the toothing is not only very resistant to wear but in the entire rotation speed range of practical interest runs with very much less noise than all hitherto known pump toothings of the type described above, for of course a given delivery power. The tooth play in the invention can be kept so small that it just permits the formation of the necessary lubricating film.

The observations made above with respect to the construction with large play between hollow gear periphery and cylinder wall of the housing applies accordingly also to the construction with large play between the shaft and pinion in which the play between the hollow gear periphery and housing inner wall is of course a minimum.

Displacement machines with epicycloid gear ring toothings have of course been known for decades. Thus, British patent specification 9359/15 describes a gear ring machine in which the teeth of the pinion are formed as epicycloids and the teeth of the hollow gear as hypocycloids. The tooth gaps in this machine are however formed as complementary curves to these cycloids so that in practice the machine cannot run. The article "Kinematics of Gerotors" by Myron F. Hill (The Peter Reilly Company, Philadelphia, 1927) already points out this defect and proposes replacing the tooth gaps of the pinion by epicycloids.

In the gear ring machines of the category of the present invention the aim is the smallest possible overall diameter. Accordingly, the diameter of the shaft guided by the pinion is always relatively large compared with the pinion. It is therefore preferred according to the invention for the pinion to have at least six teeth. Since on the other hand meter), the pinion tooth number should not be made too large, either. Here, numbers from 7 to 11 are preferred, or even better 8 to 10, and still better 9.

With the invention it is not necessary for the tooth width measured on the rolling circle or pitch circle to be the same as the tooth gap of the toothing on the rolling circular pitch. Thus, for example, the (small) forming circle for generating the epicycloids may be made somewhat greater than the (small) forming circle for generating the hypocycloids. As a result the teeth of the pinion will be somewhat wider and higher and those of the hollow gear somewhat narrower and lower. Two conditions must be fulfilled here:

1. The sum of the two different forming circle radii must be equal to the eccentricity e and
2. on both gears the forming circle radii for generating the epicycloids and the forming circle radii for generating the hypocycloids must be respectively identical.

Preferably, however, the two forming circles have the same diameters.

Reference is made here to small and large forming circles because in the generation of cycloids on the inside on a circular base line, i.e. on a fixed circle, a (small) forming circle having a diameter which is substantially less than the radius of the fixed circle on rolling in the fixed circle generates a hypocycloid which is identical to the cycloid which is generated by a (large) forming circle having a diameter which is equal to the diameter of the fixed circle reduced by the diameter of the small forming circle.

This applies similarly to epicycloids. In this case, when a (small) forming circle rolls on the outside on the fixed circle the same epicycloid is generated as on rolling a (large) forming circle having a diameter equal to the sum of the diameters of the small forming circle and the fixed circle. Thus, if the two small forming circles for generating the epicycloids and hypocycloids have the same diameters, as is preferred, the tooth width both of the pinion and of the hollow gear measured on the corresponding fixed circle is identical.

As is known, the components of the tooth forces in a transmission acting in the axis spacing direction are the smaller the smaller the engagement angle of the toothing. This optimum condition is fulfilled if the radius of the small forming circle for generating the epicycloid in the pinion and the radius of the small forming circle for generating the epicycloid in the hollow gear are identical. This applies depending on whether the small or the large forming circles are considered, of course in both cases provided the condition is fulfilled that the fixed circles for generating the cycloids are respectively equal to the pitch as rolling circle of the gear. The engagement line of the teeth is then a closed circle which at the points of deepest tooth engagement contacts the two pitch circles as rolling circles circles or fixed circles as third circle. As a result, at the contact point of the two rolling or pitch circles the engagement angle is equal to zero because there the circular engagement line has a tangent perpendicular to the axis spacing line.

It is particularly advantageous for the dimensioning and the kinematics if the fixed circle radius of each gear is equal to the product of the axis spacing of the two gears and the tooth number of the respective gears and the sum of the two small forming circle radii is equal to the axis spacing. This is identical to the statement that the difference between the two large forming circle radii is equal to the axis spacing.

Further advantageous embodiments of the invention are set forth in the description which follows.

The exact production of toothings according to the invention is carried out in simplest manner by means of numerically controlled machine tools. These make it possible to produce very accurately and relatively economically any desired digitally designed curve form. Each gear can be made separately. For large production numbers, for which the invention is primarily suitable, only the tools for the preliminary series production of the gears will be made on a numerically controlled machine tool. The mass production will then for example be carried out by powder-metallic sintering or made from nonmetallic pulverized materials, such as SiC with such a tool. The cycloidically formed tooth heads of both gears may be surface-hardened. This has the further substantial advantage that nonmetallic extremely hard materials can also be used, for example Cermets.

BRIEF DESCRIPTION OF THE DRAWINGS

The invention is described in more detail hereinafter with the aid of the accompanying schematic drawings, wherein.

DESCRIPTION OF THE PREFERRED EMBODIMENTS

Figure 1:
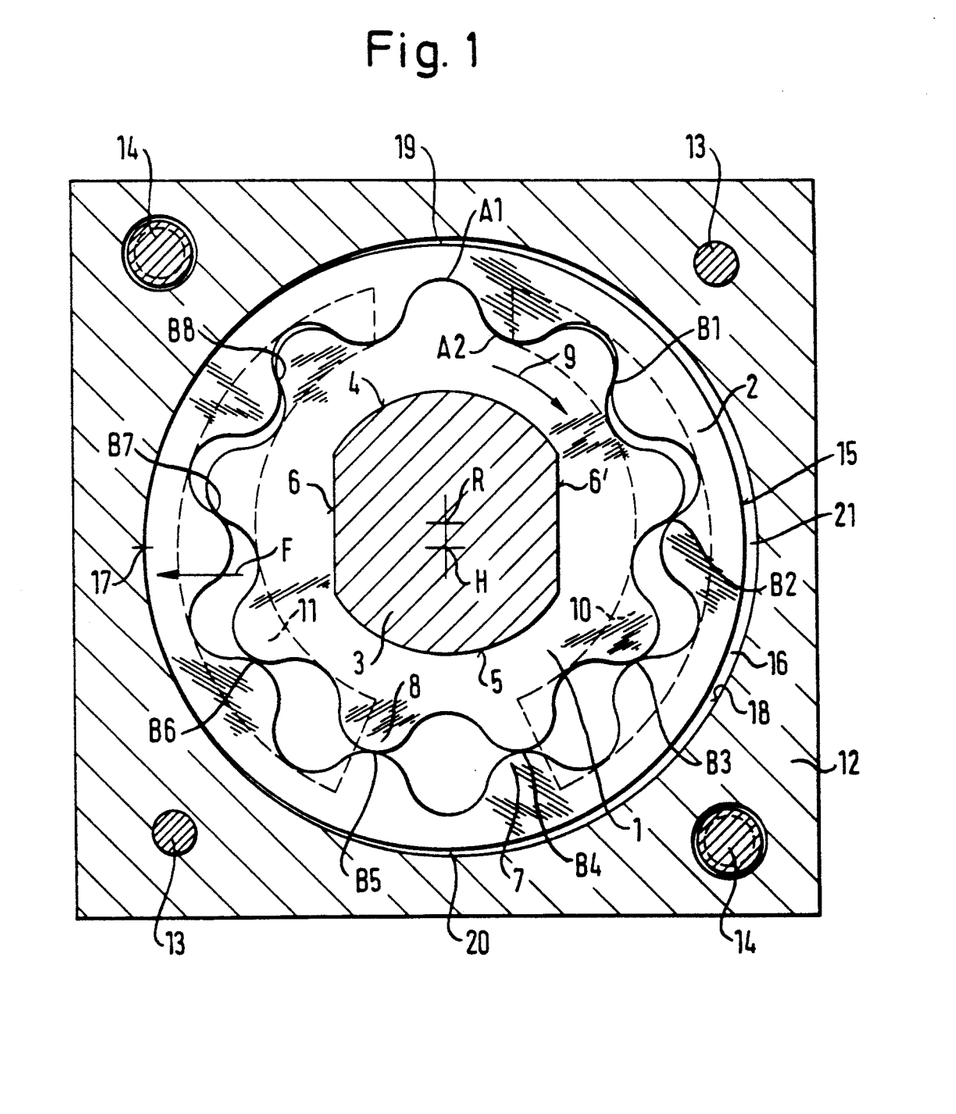
FIG. 1 shows a preferred embodiment of a lubricating oil pump mounted on the crankshaft of a motor vehicle piston engine and having large play between the hollow gear periphery and housing when the cover is removed.

In the oil pump shown in FIG. 1 the pinion is mounted on the drive shaft 3. The centering is via the cylindrical shaft periphery portions 4 and 5 and the torque transmission via the pivot-with-cheeks 6 and 6'. The hollow gear 2 meshes with its internal teeth 7 with the external teeth 8 of the pinion. On rotation in the direction of the arrow 9 the side chamber 10 shown in dash line is the suction opening whilst the side chamber 11, also shown in dashed line, is the pressure opening of the pump. Both side chambers 10 and 11 are arranged in the housing 12 as depression behind the gear space. The housing is centered for example via locating pins 13 and screws 14 with the engine housing or transmission housing in which the drive shaft 3 is mounted. In accordance with the invention the hollow gear 2 is mounted with its outer peripheral surface 15 with very large radial play 16 of for example four thousandths of the hollow gear periphery with respect to the pump housing 12, this play being exaggerated in size in FIG. 1 for clarity. On the pressure side of the pump, i.e. in the region of the side chamber 11, the hydraulic pressure exerts an outwardly directed force (resultant) F on the hollow gear 2 so that in the point 17 it comes to bear with its outer diameter 15 in the housing bore 18. This is however only the case if, as shown in the drawing, the hollow gear centre H coincides in the axial spacing direction with the centre of the cylindrical housing bore 18. Since due to the narrow tooth play provided according to the invention the hollow gear to a major extent also follows the radial movements of the pinion, in particular in the axial spacing direction at the points 19 and 20, a movement free space is provided for the hollow gear which with a circular cylindrical cavity 18 in the housing leads to the excessive hollow gear running play 16. It is possible to stabilize the mounting of the hollow gear in the housing by making the cavity 18 a so-called "lemon play bearing" in which the bearing gap is made larger at 19 and 20 than at the point 17 or 21. Such "lemon play bearings" are used to a great extent in turboengines and turbo transmissions for hydrodynamic stabilization of the shaft to suppress dangerous radial vibrations. However, such bearing forms are of course complicated in production. In the description of the invention a circular mounting of the hollow gear in the housing is therefore shown although a bearing with "lemon bore" should result in a further noise reduction.

If now the centre point of the shaft 3 and thus also the pinion 1 executes radial journal displacements and unfavourable tolerance summation results in shifts in the centering of the pump housing 12 with respect to the engine or transmission housing not shown in the drawings, these shifts can easily be compensated in the direction of the line 17-21, i.e. perpendicularly to the axial spacing line 19-20, because in this direction the hollow gear centre point H can yield with respect to the pinion centre point R by slight rotation of the hollow gear. This means that the axial spacing line would rotate somewhat in this case. Since however in this direction extremely dynamic position changes are involved which occur with the frequency of the engine speed, for example 7000/min, the axial spacing line would have to rotate to and fro with the same speed and this would lead to very high accelerations and inertial forces.

However, in the direction of the axial spacing line 19-20 with small tooth play an elevated bearing play is absolutely essential. If in this direction the total offset, that is the housing offset plus dynamic journal displacement, is greater than the remaining radial bearing gap at 19 or 20 it may happen that the gear ring toothing for example must take up the load of the front crankshaft bearing, which amounts to several ten thousand Newtons. This would result in destruction of the gear ring toothing, or at least very rapid wear thereof. The hollow gear running play 21 thus depends on the minimum gap 19 and 20 and with a circular hollow gear bearing surface 18 in the housing this means that the play 21 must be as large as the sum of the radial gaps 19 and 20.

As a result of the journal shift in the axial spacing direction 19-20 the contact point 17 must continuously change its position to a still far greater extent and this means that the position of the smallest lubricating film changes its location, with a frequency which is several times greater. According to the theory of hydrodynamic sliding bearings an unsteady load case is then present with very complicated movement sequences. When using the toothings hitherto employed the hollow gear starts to flutter. This necessarily results in knocking and thus pronounced noise development with all its other consequences such as wear or vibration cavitation in the lubricating film and in the working spaces.

Figure 2:
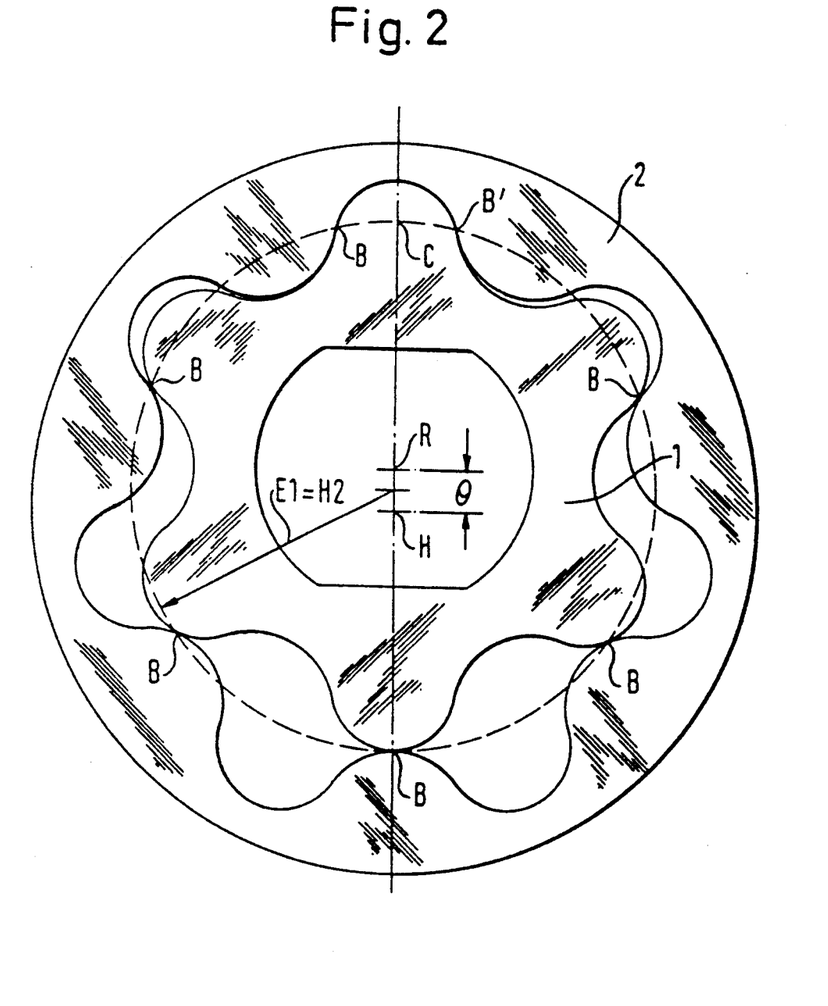
FIG. 2 shows a gear ring set with a pronounced low number of teeth.
Figure 3:
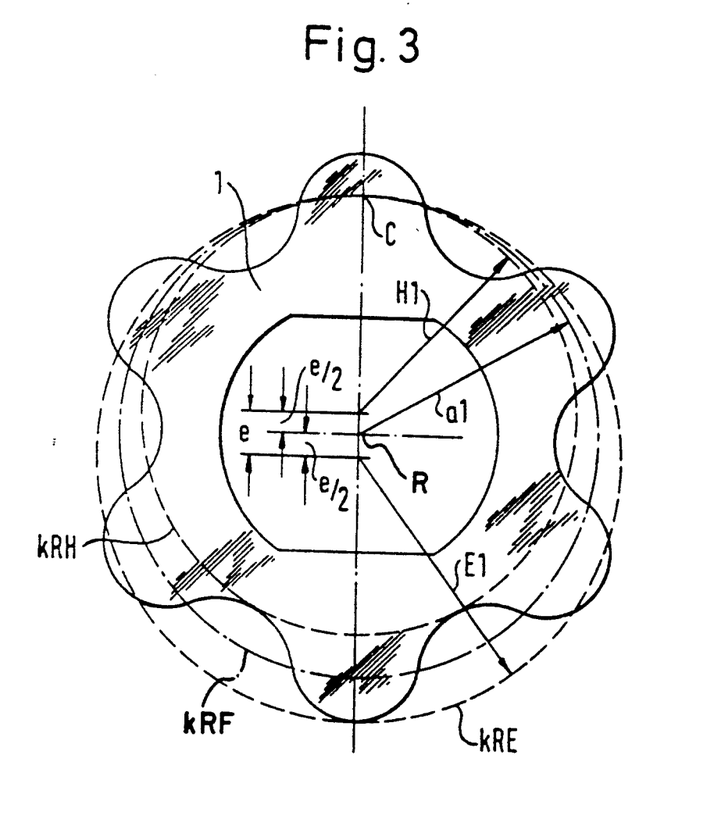
FIG. 3 shows the geometrical relationships of the pinion toothing according to FIG. 2.

The invention avoids this by using a toothing having the highest possible loadbearing capacity and narrowest total tooth play. The tooth engagement A1 in the angular position drawn or A2 in the angular position further rotated by half a pinion tooth pitch with almost 100 percent flush engagement of the tooth head on the tooth foot of the opposing gear correspond in the example drawn to eight tooth head engagement points B1 to B8 which ensure a maximum loadbearing capacity and damping. On rotation of the gears at the points A1 or A2 a squeezed oil film forms and at the points B3 to B6 between the tooth heads a hydrodynamic lubricating film which together are able to properly hydrodynamically mount the hollow gear on the gear ring toothing. The number of B support points should not be too small here. The minimum tooth number for the particular operating conditions is best determined empirically. Mass production of the gears, as herein before noted, may be carried out by sintering with nonmetallic, extremely hard materials, for example SiC. The toothing with 9:10 teeth illustrated in this FIG. 1 has proved very good. It has surprisingly been found that for the invention the most suitable gear ring toothing is one having a basic geometry which has been known for more than a century but has been forgotten (gerotors, 1927). To illustrate more clearly the geometrical relationships for the idea underlying the invention FIG. 2 shows a running set with a 6:7 toothing, the pinion and hollow gear of which are again separately illustrated in FIGS. 3 and 4. An axis spacing or eccentricity e is assumed. With a tooth number difference of 1 the modulus m as a measure for the tooth forming ($t = m \times \pi$) is then equal to twice the eccentricity e. In FIG. 3 the rolling or pitch circle radius of the pinion is thus calculated as $a1 = m/2 \times Z1 = e \times Z1$. Analogously, in FIG. 4 the pitch radius a2 of the hollow gear is calculated as $a2 = m/2 \times Z2 = e \times Z2$. In the above formulae, Z is the number of teeth, Z1 being the number of teeth of the pinion an Z2 being the number of teeth of the hollow gear. The two pitch circles or rolling circles roll on each other in slip-free manner.

Figure 4:
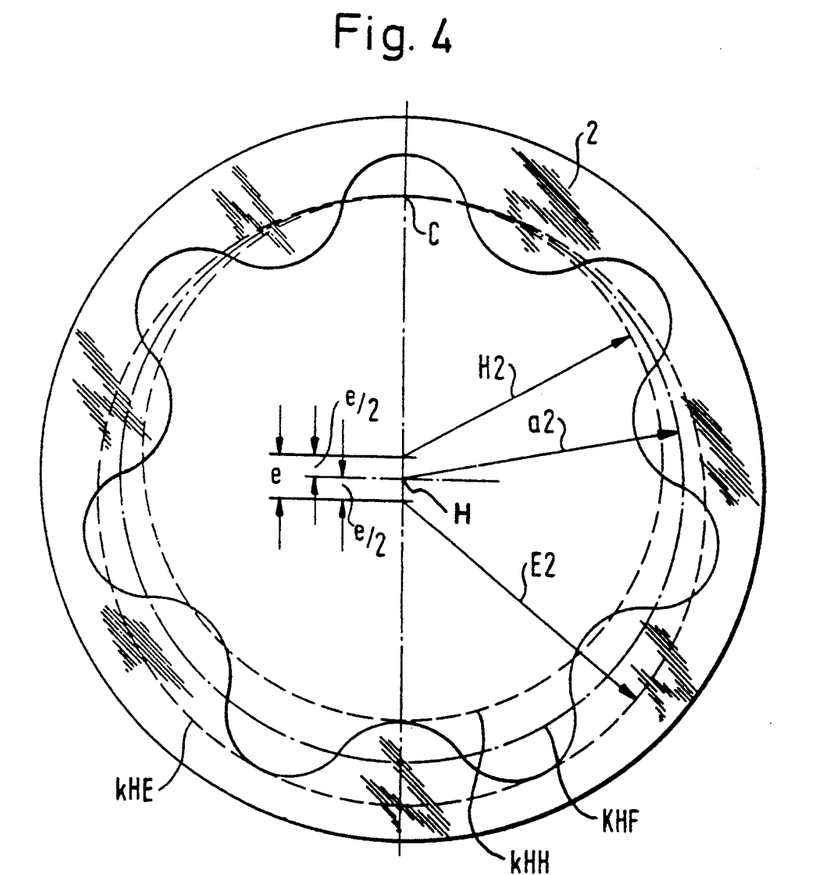
FIG. 4 shows the geometrical relationships of the hollow gear toothing according to FIG. 2.

If for the pinion as large forming circle for generating the tooth head epicycloids (FIG. 3) a circle having the radius $$E1 = a1 + \frac{e}{2}$$

chosen and for the hollow gear as large forming circle for generating the tooth head hypocycloid (FIG. 4) a circle with radius $$H2 = a2 - \frac{e}{2}$$

is chosen, then as can be easily proved these two forming circles for the generation of the tooth heads extending above the pinion fixed circle outwardly and above the hollow gear fixed circle inwardly and each defined by a full cycloid arc are identical. In FIG. 2 this common "large tooth head forming circle" is shown in dashed line. It is at the same time the geometrical locus of all the tooth head engagement points B and at the point C it contacts simultaneously the two fixed circles identical to the pitch circles and having the radii a1 and a2 (FIGS. 3 and 4). As can easily been seen in FIGS. 3 and 4, in the case of the pinion every other epicycloid arc is omitted and in the case of the hollow gear every other hypocycloid arc in order to form intermediate spaces (tooth gaps) for a solid meshing engagement. The conditions described above also apply to the cycloid arcs omitted. Analogously, the tooth gaps are likewise formed as epicycloids and hypocycloids which result from large forming circles having a radius which in the case of the pinion (FIG. 3) is smaller by an amount $$\frac{e}{2}$$

and in the case of the hollow gear is larger by an amount $$\frac{e}{2}$$

than the respective fixed circle radius.

If the larger of the two large forming circles now allowed to rotate about the fixed circle of the hollow gear it generates on the outside on said gear a closed sequence of epicycloids. If every other of them is omitted and replaced by the hypocycloids inwardly defining the respective teeth, it is seen that the epicycloids defining the tooth gaps of the hollow gear merge with a common tangent, extending perpendicularly to the fixed circle, into the hypocycloids defining the teeth. Of the latter of course, every other is again omitted.

In the same manner, the rolling of the smaller of the two large forming circles in the fixed circle of the pinion generates the hypocycloids defining the tooth gaps therein (FIG. 3) which likewise merge gradually with a tangent extending radially to the smaller fixed circle of the pinion into the epicycloids defining the teeth of the pinion. In this case as well of course, every other hypocycloid is omitted. The cycloids omitted are each indicated in dash line once in FIG. 5.

Figure 5:
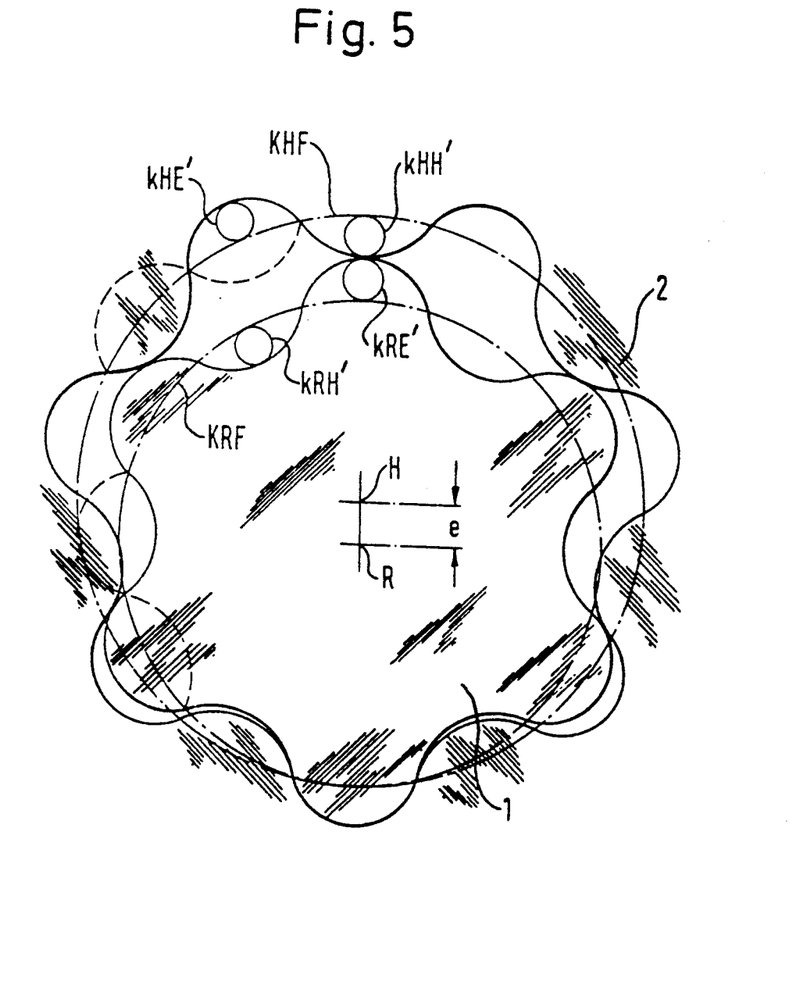
FIG. 5 shows again the geometry of the toothing according to FIG. 2 to 4, illustrating however the formation of the epicycloids and hypocycloids by the small forming circles.

As apparent from FIG. 5 the cycloids defining the tooth gaps and teeth can be developed as by the large forming circles kRH, kRE, kHE, kHH, FIGS. 3 and 4, in somewhat clearer manner by the corresponding small forming circles shown in FIG. 5. In this example all the small forming circles kHE', kHH', kRH', kRE' are equal as corresponds also to the examples according to FIG. 2 as well as FIGS. 3 and 4.

Figure 6:
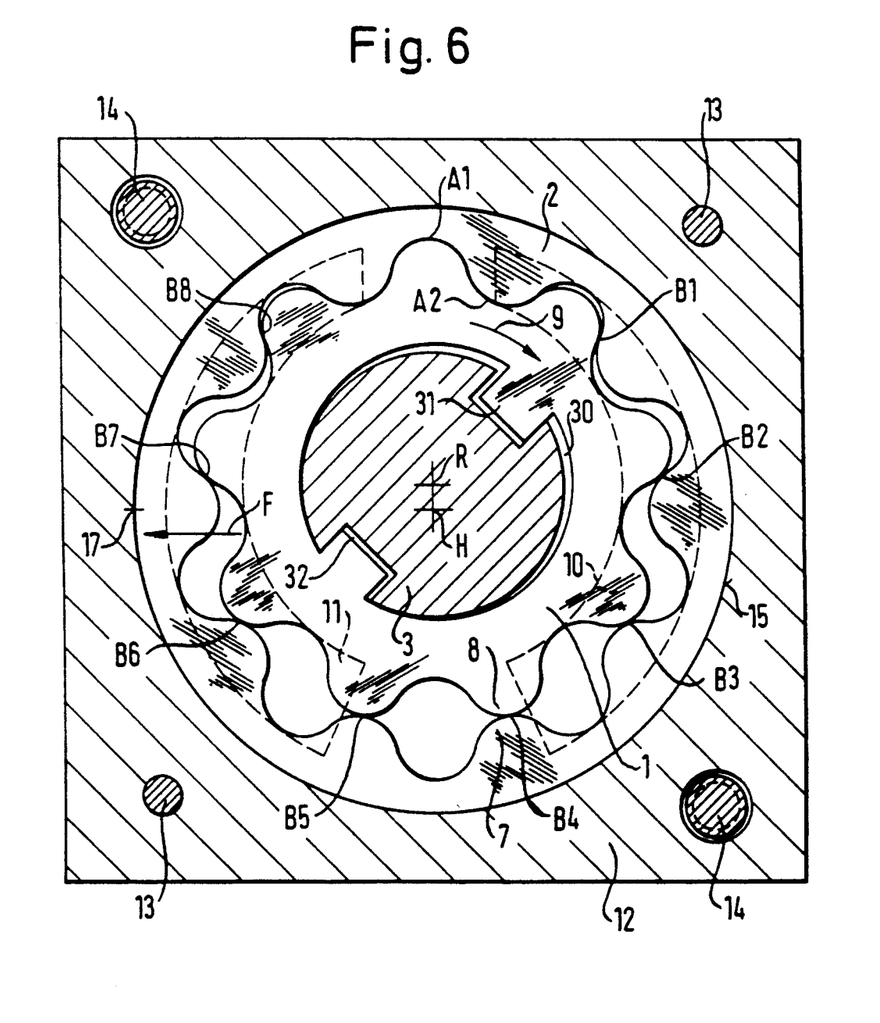
FIG. 6 shows in the same illustration as FIG. 1 an embodiment of the invention with large clearance between shaft and pinion.

In the construction shown in FIG. 6 the same reference numerals are used as in FIG. 1. In contrast to the construction according to FIG. 1, however, in this case the hollow gear 2 is mounted with small play radially in the housing 12. The toothing of the hollow gear 2 and of the pinion 1 is the same as in the previously described example. Due to the mounting of the hollow gear in the housing preventing a radial shift a concentric rotation of the pinion about the pinion centre point R is also forced to take place because the pinion is mounted rotatably about its axis R with its toothing in the toothing of the hollow gear 2.

Furthermore, in contrast to the construction of FIG. 1 the large play is provided here between the shaft 3 and the bore of the pinion 1. The corresponding gap is denoted by 30 in FIG. 6. Two catches 31 of the pinion engage into corresponding grooves 32 of the shaft 3. The grooves 32 are made larger than the catches 31 to the extent necessary to permit the shaft to carry out the radial shifts occurring in the bore of the pinion 1 which is "too large" for said shaft without however exerting any troublesome radial pressures on the cylindrical inner surfaces of the bore of the pinion or the facing parallel planar surfaces of the catches 31.

The detailed remarks on the construction according to FIG. 1 apply analogously to the mode of operation of this construction. In this case as well, the gap between the shaft 3 and the bore of the pinion should not be substantially greater than is required to permit the maximum radial shifts of the shaft because of course the shaft in this case serves not only to effect the rotation of the pinion but also to prevent a rotation of the pinion centre R about the centre of the hollow gear H.

I claim:

1. A gear ring oil pump for use on reciprocating-piston-internal-combustion engines and automatic transmissions, comprising:
   a pump housing having a substantially cylindrical bore therein and a drive shaft bore, the axis of said drive shaft bore being radially spaced from h axis of said substantially cylindrical bore,
   a pinion having external gear teeth equally spaced around the axis of said pinion,
   a hollow gear with internal gear teeth having one tooth more than said external teeth on said pinion,
   said pinion and said hollow gear being housed in said substantially cylindrical bore,
   the circumference of said hollow, gear being radially guided by the circumference surface of said substantially cylindrical bore,
   a drive shaft passing through said drive shaft bore for driving said pinion,
   said pinion drive shaft having radial play in said drive shaft bore
   and means for allowing radial movement of said drive shaft relative to the circumference surface of said substantially cylindrical bore with a play large enough to allow radial movement of said drive shaft within a limit which is far smaller than the radial distance between the axis of said substantially cylindrical bore and the axis of said drive shaft bore,
   the tooth heads of said hollow gear having the profile of hypocycloids which are formed by rolling a first forming circle on a first fixed circle concentrically to the axis of said hollow gear,
   the tooth gaps of said pinion having the profile of hypocycloids which are formed by rolling said first forming circle on a second fixed circle concentrically to the axis of said pinion,
   the tooth heads of said pinion having the profile of epicycloids which are formed by rolling a second forming circle on said second fixed circle,
   the tooth gaps of said hollow gear having the profile of epicycloids which are formed by rolling said second forming circle on said first fixed circle,
   the sum of the circumferences of said first and said second forming circles being substantially equal to the tooth pitch of said hollow gear and said pinion on said first fixed circle of said hollow gear and said second fixed circle of said pinion, said hollow gear and said pinion meshing with such a minimum tooth play that each tooth of said hollow gear is always in contact with said pinion and vice-versa, said drive shaft being the main shaft of the machine on which the pump is used.

2. An oil pump according to claim 1, wherein said two forming circles have the same diameter.

3. An oil pump according to claim 1, wherein said first fixed circle is equal to the rolling circle of said hollow gear and said second fixed circle is equal to the rolling circle of said pinion.

4. An oil pump according to claim 3, wherein the rolling circle radius of said hollow gear and of said pinion is equal to the product of the axial spacing of said hollow gear and said pinion and the tooth number of said hollow gear and said pinion respectively, and wherein the sum of the radii of said first and second forming circles is equal to the radial spacing of said hollow gear and said pinion.

5. A gear ring pump according to claim 1, wherein said tooth play at the tooth engagement opposite the point of deepest tooth engagement of said pinion and said hollow gear is only a few hundredths of a millimeter, preferably between 2 and 5 hundredths of a millimeter.

6. A gear ring pump according to claim 1, wherein at least said cycloidically formed tooth heads of said hollow gear and said pinion, are surface-hardened.

7. A gear ring pump according to claim 1, wherein said pinion and said hollow gear are made by a powder-metallic sintering method.

8. A gear ring pump according to claim 7, wherein said pinion and said hollow gear are made from non-metallic pulverized materials, for example SiC.

9. A gear ring pump as recited in claim 1, wherein said pinion is radially rigidly fixed on said driving shaft and said means for radial movement of said driving shaft relative to said cylindrical bore includes said hollow gear having a circumference smaller than the circumference of said cylindrical bore.

10. A gear ring pump as recited in claim 1, wherein said hollow gear is mounted with regular radial play in said cylindrical bore and said means for radial movement of said driving shaft relative to said cylindrical bore includes said pinion being arranged on said driving shaft in a driver connection with radial play large enough to allow the radial movements of said driving shaft.

11. A gear ring pump as recited in claim 10, wherein diametrically opposed square grooves in said drive shaft are engaging catches in said pinion extending inwardly from the inner periphery of the bore of said pinion around the square grooved end of said pinion, the I.D. of said bore of said pinion being larger than the O.D. of said drive shaft.

* * * * *